May 6, 1941.  W. G. MYLIUS  2,240,666
WATT-HOUR METER
Filed Aug. 25, 1938  2 Sheets-Sheet 1
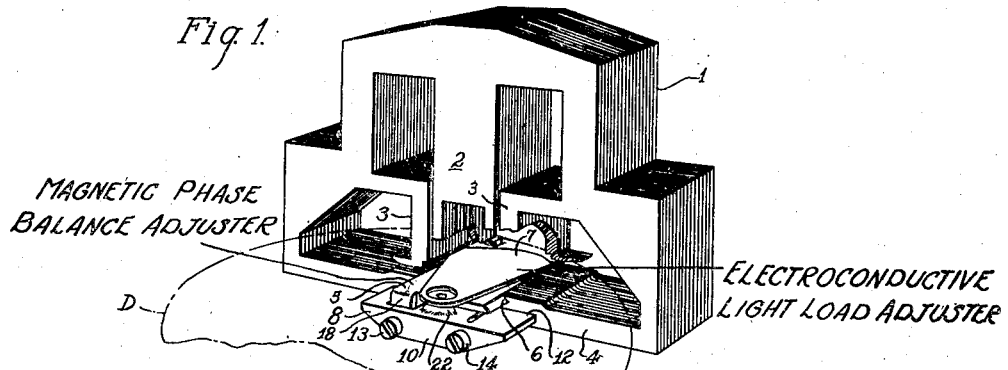
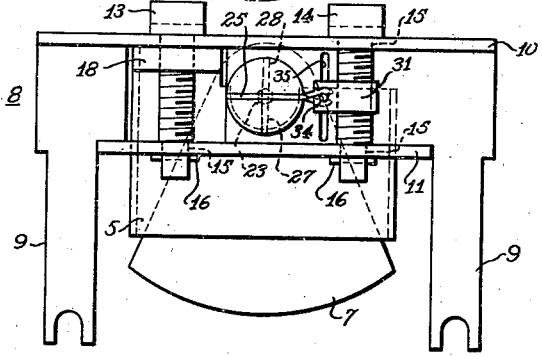
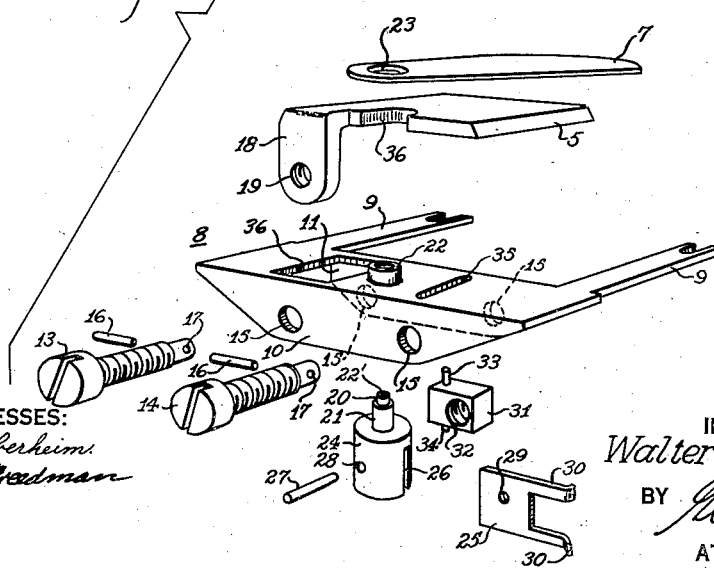
WITNESSES:
INVENTOR
Walter G. Mylius.
BY
ATTORNEY May 6, 1941.  W. G. MYLIUS  2,240,666
WATT-HOUR METER
Filed Aug. 25, 1938  2 Sheets-Sheet 2

WITNESSES:
E. F. Oberheim
C. L. Friedman

INVENTOR
Walter G. Mylius.
BY
ATTORNEY

Patented May 6, 1941

2,240,666

UNITED STATES PATENT OFFICE 2,240,666

WATT-HOUR METER

Walter G. Mylius, Summit, N. J., assignor to Westinghouse Electric & Manufacturing Company, East Pittsburgh, Pa., a corporation of Pennsylvania Application August 25, 1938, Serial No. 226,621

11 Claims. (Cl. 171—264)

This invention relates to instruments, and it has particular relation to electrical instruments of the watt-hour meter type.

Because of manufacturing tolerances and variations in materials, it has been the practice to provide instruments such as watt-hour meters with a number of adjustments. For example, a polyphase watt-hour meter ordinarily has light load, full load, power factor and phase balance adjustments provided. Ordinarily such adjustments are attached to any portion of the meter structure which may be available. Such indiscriminant location of the adjustments has resulted in awkward positions of the actuating means for the adjustments and increased cost of manufacture. For example, in order to adjust some meters it has been necessary to make some of the adjustments from the front face of the meters and other adjustments from side or rear faces thereof. These awkward positionings of the adjusting devices are undesirable for the reason that they are conducive to carelessness on the part of the person making the adjustments. This applies particularly to the adjustments for phase balance and light load. The adjustment for full load ordinarily is effected by an adjustment of the permanent magnets used for damping the meter, and the adjustment for power factor may be effected by varying the resistance of the power factor coil. However, both the light load and phase balance adjustments are associated with the meter core and should be conveniently accessible.

In accordance with my invention a plurality of adjustments are assembled in a compact unit. In one embodiment of my invention a phase balance adjusting element is mounted for reciprocation across a portion of a meter core and a light load adjustment element is mounted for rotation across the same portion of the meter core. Both of these adjusting elements are actuated by screws which are accessible from the front of the meter unit. In order to eliminate any variation in the adjustment due to vibration of the meter parts or other causes, I may include in at least one of the adjustment devices a self-locking construction.

It is, therefore, an object of my invention to provide an adjustment unit having a plurality of adjusting elements.

It is another object of my invention to provide a plurality of parallel screws for actuating a plurality of adjusting elements.

It is a further object of my invention to provide a plurality of superposed adjusting elements.

It is a still further object of my invention to provide an adjusting element reciprocable across a portion of a meter core and a second adjusting element rotatable across a portion of a meter core.

It is a still further object of my invention to provide an adjusting device which is self-locking in any position to which it is actuated.

Other objects of my invention will be apparent from the following description taken in conjunction with the accompanying drawings, in which:

Figure 1 is a perspective view of a meter core embodying my invention,

Fig. 2 is a view in bottom plan of the adjusting unit shown in Fig. 1,

Fig. 3 is an exploded view in perspective of the adjusting unit shown in Figs. 1 and 2, and Figs. 4 to 9, inclusive, are detail views of modifications of the structure illustrated in Figs. 1 to 3, inclusive.

Figure 4:
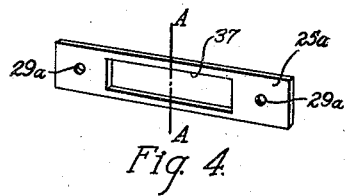

Referring to the drawings, Figure 1 shows a meter core 1 which may be of the type having a potential pole 2 and current poles 3 all located above a magnetic flux return member or keeper 4. For further details of this well known core, reference may be made to Patents Nos. 1,691,354 and 1,702,450.

In order to adjust meters employing such cores for phase balance I mount a magnetic member 5 of material such as soft iron for reciprocation in a recess 6 provided in the keeper 4. This magnetic plate may be retained more securely if the coacting edges of the recess 6 and the plate are bevelled to provide an overhanging or dovetail relationship. A construction of the type thus far described is illustrated in the aforesaid Patent No. 1,702,450.

Errors in light load performance of a meter may be corrected by means of a segment 7 of an electroconductive material such as brass which may be rotated across the face of the potential pole 2. It should be noted that the segment 7 overlies the magnetic plate 5. As shown in broken lines, a rotatable electroconductive disk D is positioned between the segment 7 and the poles 2, 3.

Both the plate 5 and the segment 7 are mounted on a single supporting member 8 having a pair of projecting slotted arms 9 and two flanges 10 and 11. The supporting member may be affixed to the core 1 by inserting the arms 9 through openings 12 provided in the keeper 4 until the slotted portions of the arms 9 emerge on the opposite side of the keeper. The supporting member may be held in this position in any suitable way as by deforming the slotted ends of the arm 9 or by applying solder thereto.

Adjustments of the plate 5 and the segment 7 are made by two parallel machine screws 13 and 14 which are rotatably mounted in openings 15 provided in the flanges 10 and 11. These screws may be retained in the openings by any suitable means, such as pins 16, which have a press fit in holes 17 drilled through the ends of the machine screws. The plate 5 is connected operatively to the screw 13 by means of a simple lug 18 provided with a tapped hole 19 through which the screw 13 is threaded. Consequently rotation of the screw 13 in a clockwise or counterclockwise direction retracts the plate 5 from the recess 6 or moves it further into the recess.

In the specific embodiment illustrated, the segment 7 is mounted on the reduced end 20 of a shaft 21 which is rotatably mounted in a bearing extending through a boss 22 formed on the supporting member 8. The segment 7 may be firmly attached to the shaft 21 in any suitable way, as by drilling a small hole 22' in the end of the shaft and forming a small hexagonal or other non-circular hole 23 in the segment 7. The reduced portion 20 may then be extended through the hole 23 and upset or peened to hold the segment 7 firmly in position. At its opposite end, the shaft 21 is provided with an enlarged head 24 which serves to restrict axial movement of the shaft. In order to rotate the shaft I attach thereto a lever 25 in any suitable way as by inserting it into a slot 26 provided in the enlarged head and passing a pin 27 through openings 28 and 29 provided in the enlarged head and lever respectively. The various pins employed for retaining purposes may be maintained in position by making them press fits, by upsetting their ends or by any other suitable procedure. For a purpose to be hereinafter set forth, one end of the lever 25 is slotted to form two fingers 30 having ends which are bent slightly in opposite directions as shown in Fig. 3.

Rotation of the screw 14 is transmitted to the lever 25 and segment 7 by means of carriage block 31 which is provided with a tapped opening 32 through which the screw 14 is threaded. Rotation of the screw consequently moves the carriage block 31 axially of the screw. The carriage block is provided with two axially aligned projecting portions or pins 33, 34 which are positioned in engagement with opposite surfaces of the fingers 30. By reference to Figs. 2 and 3 it will be seen that a portion of the carriage block extends into the slot of the lever 25 to aid in keeping the various elements in alignment. To aid further in maintaining the various parts in alignment, the pin 33 may be extended so that it is received in a guide slot 35 formed in the member 8. Consequently, rotation of the screw 14 reciprocates the carriage block 31 and this in turn rotates the lever and segment on their supporting shaft 21. The fingers 30 are sufficiently long to permit the required movement of the carriage block without releasing their hold on the projecting portions 33, 34.

Referring to Fig. 3 it will be noted that the fingers 30 both are in substantially the same plane. When the carriage block 31 is inserted in the slot of the lever 25 and moved to a position such that the screw 14 may be passed through the tapped opening 32, the projecting portions or pins 33, 34 engage the sides of the fingers 30 and displace the two fingers slightly in opposite directions from their normal plane, as shown in Fig. 2. If the fingers are formed of a resilient or spring material, such as spring brass, a torque will be applied thereby against the carriage 31 tending to maintain or lock it in any position to which it is moved. This resilient action also eliminates any back lash which otherwise may be present between the shaft 21 and the screw 14.

In order to provide adequate movement of the plate 5 without undue increase in the size thereof, a slot 36 may be formed therein for clearing the boss 22. Preferably the segment 7 is depressed slightly adjacent the hole 23 to receive the upset part of the reduced portion 20 or other attaching means employed.

The structure thus far described is particularly useful in a polyphase watt-hour meter of the compact type disclosed in the Bradshaw Patent No. 2,081,981. When two meter cores are employed for such a polyphase watt-hour meter they may be positioned with all four of the adjusting screws accessible from the front of the meter. Since the meter must be so mounted that its register is readable, substantially any opening sufficient to expose the register will be large enough to give access to the four adjusting screws. This would permit such a meter to be employed in small openings that would not give access to the adjusting devices available in the prior art.

It is believed that the operation of the structure thus far described is apparent. If a meter employing a core of the type herein disclosed is found to register incorrectly under light loads, the screw 14 is rotated to correct the light load error. This moves the electroconductive segment 7 across the potential pole face to lag more or less flux, thereby producing an adjustable starting torque. If on the other hand the phase balance requires correction, the screw 13 is rotated to move the plate 5 into proper position for correcting the phase balance. Movement of the magnetic plate 5 has the effect of varying the gap beneath the potential pole 2.

Except for the magnetic plate 5 the remaining parts of the adjustment unit shown in Fig. 3 conveniently may be constructed of a non-magnetic material such as brass or bronze.

Figure 5:
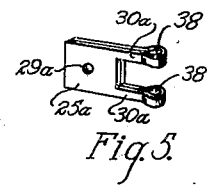

Several modifications of the actuating means for the segment 7 are illustrated in Figs. 4 to 9, inclusive. For example, the lever 25 may be replaced by a lever 25a constructed as shown in Figs. 4 and 5. The lever 25a is formed by bending a strip of suitable material, such as brass, about a central axis AA for providing the doubled construction shown in Fig. 5. A slot 37 in the strip furnishes two fingers 30a which preferably have enlarged eyes 38 at their ends for reception of the pins 33 and 34. In use, the strip may be folded around the pins 33, 34 and the doubled ends placed in the slot 26, holes 29a being positioned to receive the pin 27. One of the fingers 30a may be bent slightly out of the plane of the lever 25a for biasing the carriage 31 in the manner above described, or both of the fingers 30a may be bent slightly out of the plane of the lever 25a in opposite directions for the same purpose if the material employed for the lever is sufficiently resilient. The fingers 30a engage the pins 33 and 34 somewhat yieldingly in order to permit sufficient play therebetween as the carriage 31 is reciprocated.

Figure 6:
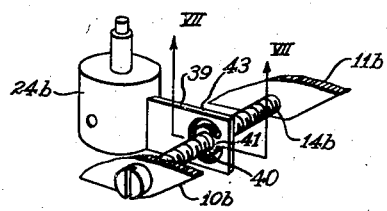
Figure 7:
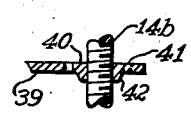

In Figs. 6 and 7, a construction is shown for replacing both the lever 25 and the carriage 31.

The members 10b, 11b, 14b and 24b of these figures correspond to the flanges 10, 11, screw 14 and head 24 of Figs. 1 to 3. For connecting the screw 14b to the head 24b, a strip 39 of flexible material, such as copper or brass is positioned in the head 24b in place of the lever 25. This strip is punched or otherwise modified to form a disk 40 connected to the body of the strip by a narrow, flexible tongue 41. By extruding the center of the disk to form a reinforcing lip 42, and threading the extruded portion, the screw 14b may be employed directly for moving the strip 39 and head 24b. This is shown more clearly in Fig. 7 which is a section taken along the line VII—VII of Fig. 6. As the screw is rotated, flexure of the tongue 41 accommodates the structure to its various positions. If the strip 39 is resilient, flexure of the tongue 41 tends to lock the assembly in any desired position and to eliminate backlash. As illustrated, the disk 40 is connected to the body of the strip 39 by fingers 43, but these fingers may be eliminated if desired and the finger-like tongue 41 employed for connecting the disk directly to the main body of the strip. That is, the tongue 41 would be located diametrically opposite to its illustrated position.

Figure 8:
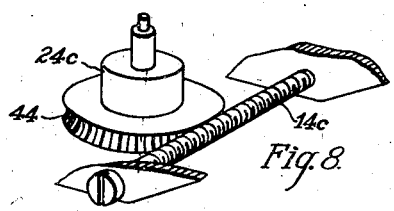

A still further modification is shown in Fig. 8 wherein a screw 14c imparts motion to a gear 44 affixed to a head 24c. The screw and head correspond to the screw 14 and head 24 of Figs. 1 to 3.

Figure 9:
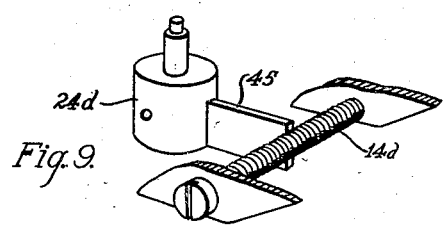

The gear 44 may be replaced by a lever 45 having a single tooth, or a few teeth, for engagement with a screw 14d as illustrated in Fig. 9 wherein a head 24d and the screw 14d correspond to the head 24 and screw 14 of Figs. 1 to 3. By making the threads of the screw 14d of sufficient depth, the lever 45 remains in operative engagement therewith for a displacement sufficient for adjustment purposes.

Although I have described my invention with reference to specific embodiments thereof, it is obvious that numerous modifications thereof are possible. Therefore, I do not wish my invention to be restricted except as required by the appended claims when interpreted in view of the prior art.

I claim as my invention:

1. In an electrical instrument, a magnetic core, an armature responsive to magnetic flux passing through said magnetic core, and an assembly for adjusting the torque applied to said armature by said magnetic flux comprising a rotatable light load adjustment element, a reciprocable phase balance adjustment element, and means for actuating said adjustment elements, said assembly being attachable to said instrument as a complete unit.

2. In an electrical instrument, a magnetic core having a pole portion, an armature movable in accordance with magnetic flux passing through said pole portion, and means for modifying the torque applied to said armature comprising a magnetic phase balance adjusting element movable for altering the reluctance of said magnetic core to magnetic flux, an electro-conductive light load adjusting element rotatable across the path of flux emanating from said pole portion for adjustably lagging magnetic flux passing through said pole portion, and a common support for said elements, said support being attachable to said magnetic core.

3. In an electrical instrument, a magnetic core having a pole portion, an armature movable in accordance with magnetic flux passing through said pole portion, and means for modifying the torque applied to said armature comprising a magnetic phase balance adjusting element movable for altering the reluctance of said magnetic core to said magnetic flux, an electro-conductive element rotatable across the path of flux emanating from said pole portion for producing an adjustable shifting magnetic field, actuating means for said elements and a common support for said elements and actuating means, said common support, elements and actuating means being attachable to said magnetic core as a unitary assembly.

4. In an electrical instrument, a magnetic core, an armature responsive to magnetic flux passing through said magnetic core, a pair of rotatable screws operable from a single side of said instrument, and adjusting means controlled by said screws including an adjustment element reciprocable in response to rotation of a first one of said screws for varying the magnetic reluctance of said magnetic core and a second adjustment element rotatable in response to rotation of a second one of said screws for producing an adjustable shifting magnetic field for said armature, said screws and elements being mounted on a common support independent of said magnetic core.

5. In an instrument, a magnetic core, a support positioned adjacent to said core, a first screw and a second screw mounted for rotation in said support, said screws being parallel, a magnetic element reciprocable across a portion of said core and having a threaded part in engagement with said first screw for actuation thereby, an electro-conductive element pivotally mounted on said support for rotation across said portion, and means for rotating said electro-conductive element in accordance with rotation of said second screw.

6. In an instrument, a magnetic core, a support positioned adjacent to said core, a first screw and a second screw mounted for rotation in said support, said screws being parallel, a magnetic element reciprocable across a portion of said core and having a threaded part in engagement with said first screw for actuation thereby, an electro-conductive element pivotally mounted on said support for rotation across said portion, and means for rotating said electro-conductive element in accordance with rotation of said second screw, said means comprising a member movable axially of said screw in accordance with rotation of said screw, and a plurality of fingers associated with said electro-conductive element, said fingers being positioned to engage said member for converting reciprocation of said member into rotation of said electro-conductive element, at least one of said fingers being resilient.

7. In an electrical instrument, a magnetic core having an air gap, a reciprocable member, a rotatable member movable through said air gap for controlling magnetic flux passing therethrough, and means for converting movement of said reciprocable member into a corresponding movement of said rotatable member comprising a plurality of fingers connected to said rotatable member for grasping said reciprocable member, at least one of said fingers being resilient.

8. In an electrical instrument, a magnetic core having an air gap, an armature rotatable in response to magnetic flux passing through said air gap, a rotatable shaft, means connected to said shaft for adjustably varying the magnetic flux in said air gap to modify the torque applied to said armature, a rotatable screw, said shaft and screw having displaced axes running at an angle relative to each other, a reciprocable carriage having threads engaging the threads of said screw for reciprocation therealong as said screw is rotated, and means for converting reciprocation of said carriage into rotation of said shaft.

9. In an electrical instrument, a magnetic core having an air gap, an armature rotatable in response to magnetic flux passing through said air gap, a rotatable shaft, means connected to said shaft for adjustably varying the magnetic flux in said air gap to modify the torque applied to said armature, a rotatable screw, said shaft and screw having displaced axes running at an angle relative to each other, a reciprocable carriage having threads engaging the threads of said screw for reciprocation therealong as said screw is rotated, and means for converting reciprocation of said carriage into rotation of said shaft comprising fingers connected to said shaft for grasping said carriage.

10. In an electrical instrument, an armature, means for passing magnetic flux through said armature for actuating said armature, and means for controlling said magnetic flux including a rotatable screw, an adjusting element to be moved in accordance with rotation of said screw, and means for coupling said screw and element, said means being free of backlash, said coupling means including threaded means for engaging said screw and a resilient member extending from said threaded means towards said adjusting element for converting movement of said threaded means into movement of said adjusting element, said resilient member being designed to urge resiliently said threaded means into firm engagement with said screw for eliminating backlash therebetween.

11. In an electrical measuring device, a magnetic core provided with an air gap, an electroconductive armature mounted in said air gap for rotation by magnetic flux passing therethrough, phase balance means for adjusting the magnetic reluctance of said magnetic core to magnetic flux passing through said air gap comprising a magnetic element movable relative to said magnetic core, means for varying the light-load torque on said armature comprising an electroconductive element movable relative to said magnetic core, and a common supporting member for said elements, said supporting member and elements being attachable relative to said magnetic core as a unitary assembly.

WALTER G. MYLIUS.